United States Patent
Liberato et al.

(10) Patent No.: US 12,020,097 B1
(45) Date of Patent: Jun. 25, 2024

(54) 2D BAR CODE USING ACTIVE OVERLAYS

(71) Applicant: Temptime Corporation, Morris Plains, NJ (US)

(72) Inventors: Eric W. Liberato, Pequannock, NJ (US); Mohannad Abdo, Clifton, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 0 days.

(21) Appl. No.: 18/103,723

(22) Filed: Jan. 31, 2023

(51) Int. Cl.
*G06K 19/06* (2006.01)

(52) U.S. Cl.
CPC .............. *G06K 19/06037* (2013.01)

(58) Field of Classification Search
CPC ......... G06K 19/06037; G06K 19/0614; G06K 19/06046; G06K 19/1473; G01N 31/229; G01K 3/04
See application file for complete search history.

(56) References Cited

U.S. PATENT DOCUMENTS

| | | |
|---|---|---|
| 4,646,066 A | 2/1987 | Baughman et al. |
| 4,729,671 A | 3/1988 | Asano et al. |
| 4,935,206 A | 6/1990 | Heim |
| 5,053,339 A | 10/1991 | Patel |
| 5,109,864 A | 5/1992 | Lu |
| 6,070,805 A | 6/2000 | Kaufman et al. |
| 6,642,016 B1 | 11/2003 | Sjoholm et al. |
| 6,685,094 B2 | 2/2004 | Cameron |
| 7,209,042 B2 | 4/2007 | Martin et al. |
| 7,490,575 B2 | 2/2009 | Taylor et al. |
| 7,604,398 B1 | 10/2009 | Akers et al. |
| 7,691,634 B2 | 4/2010 | Vaillant |
| 7,719,404 B2 | 5/2010 | Makela et al. |
| 7,878,410 B2 | 2/2011 | Norrby et al. |
| 8,267,576 B2 | 9/2012 | Haarer et al. |
| 8,395,521 B2 | 3/2013 | Kauffman et al. |
| 8,579,193 B2 | 11/2013 | Nemet et al. |
| 8,629,081 B2 | 1/2014 | Azizian |
| 8,757,503 B2 | 6/2014 | Conzelmann |
| 8,870,082 B2 | 10/2014 | Cattaneo et al. |
| 8,899,829 B1 | 12/2014 | Butera et al. |

(Continued)

FOREIGN PATENT DOCUMENTS

| | | |
|---|---|---|
| CN | 101769884 | 7/2010 |
| CN | 103543146 | 1/2014 |

(Continued)

OTHER PUBLICATIONS

R. E. Blahut, "Theory and Practice of Error Control Codes (corr. Edition)", 1983, p. 166.

(Continued)

*Primary Examiner* — Laura A Gudorf
(74) *Attorney, Agent, or Firm* — K&L Gates LLP

(57) ABSTRACT

An apparatus, system, and method for adding an overlay to a bar code symbol is disclosed. The bar code symbol is affixed to a perishable host product. The overlay includes a transparent substrate and an environmental exposure indicator material which is responsive to an environmental stimulus. When the overlay is affixed to the bar code symbol, both static and dynamic data regarding the perishable host product can be determined.

40 Claims, 10 Drawing Sheets

(56) References Cited

U.S. PATENT DOCUMENTS

| | | | |
|---|---|---|---|
| 8,957,780 | B2 | 2/2015 | Cooperman |
| 8,968,662 | B2 | 3/2015 | Haarer et al. |
| 9,011,794 | B2 | 4/2015 | Haarer et al. |
| 9,022,292 | B1 | 5/2015 | van der Merwe et al. |
| 9,606,140 | B2 | 3/2017 | Burghardt et al. |
| 2003/0042317 | A1 | 3/2003 | Behm et al. |
| 2003/0047477 | A1 | 3/2003 | Nygardh et al. |
| 2003/0098357 | A1 | 5/2003 | Cummings et al. |
| 2004/0092023 | A1 | 5/2004 | Wright |
| 2004/0212509 | A1 | 10/2004 | Zweig |
| 2005/0162274 | A1 | 7/2005 | Shniberg et al. |
| 2006/0083657 | A1 | 4/2006 | McDonnell et al. |
| 2006/0091215 | A1 | 5/2006 | Uchiyama |
| 2006/0227669 | A1 | 10/2006 | Pennaz et al. |
| 2007/0041423 | A1* | 2/2007 | Nygardh ............... B65D 79/02 374/141 |
| 2007/0058493 | A1 | 3/2007 | Kuczynski et al. |
| 2007/0275467 | A1 | 11/2007 | Louvet et al. |
| 2008/0063575 | A1 | 3/2008 | Rakow et al. |
| 2008/0173712 | A1 | 7/2008 | Nemet et al. |
| 2008/0232427 | A1 | 9/2008 | Leute et al. |
| 2009/0010304 | A1 | 1/2009 | Skinner et al. |
| 2009/0020609 | A1 | 1/2009 | Cohen |
| 2009/0166438 | A1 | 7/2009 | Sanchez et al. |
| 2010/0012018 | A1 | 1/2010 | Ribi |
| 2011/0006109 | A1 | 1/2011 | Nemet et al. |
| 2011/0084128 | A1 | 4/2011 | Haarer et al. |
| 2011/0258130 | A1 | 10/2011 | Grabiner et al. |
| 2011/0312096 | A1 | 12/2011 | Whitman et al. |
| 2012/0079981 | A1 | 4/2012 | Huffman et al. |
| 2012/0172825 | A1 | 7/2012 | Ales et al. |
| 2012/0175412 | A1 | 7/2012 | Grabiner et al. |
| 2012/0286028 | A1 | 11/2012 | Simske et al. |
| 2012/0326878 | A1 | 12/2012 | Viguie et al. |
| 2013/0015236 | A1 | 1/2013 | Porter |
| 2013/0215004 | A1 | 8/2013 | Nordlinder |
| 2013/0224875 | A1 | 8/2013 | Haarer et al. |
| 2014/0009605 | A1 | 1/2014 | Lane |
| 2014/0023264 | A1 | 1/2014 | Branch et al. |
| 2014/0127738 | A1 | 5/2014 | Lee et al. |
| 2014/0154808 | A1 | 6/2014 | Patel |
| 2014/0252081 | A1* | 9/2014 | Gutierrez ........... G06Q 30/0623 235/375 |
| 2014/0252096 | A1 | 9/2014 | Nemet |
| 2014/0263651 | A1 | 9/2014 | Mesh-Iliescu et al. |
| 2014/0334723 | A1 | 11/2014 | Chatow et al. |
| 2014/0339312 | A1 | 11/2014 | Simske |
| 2015/0053776 | A1 | 2/2015 | Nemet et al. |
| 2015/0116093 | A1 | 4/2015 | Swager et al. |
| 2015/0193677 | A1 | 7/2015 | Nemet |
| 2015/0317923 | A1 | 11/2015 | Edmonds et al. |
| 2015/0332135 | A1 | 11/2015 | Dixit et al. |
| 2015/0347886 | A1 | 12/2015 | Fang et al. |
| 2016/0154939 | A1 | 6/2016 | Grabiner et al. |
| 2016/0292486 | A1 | 10/2016 | Prusik et al. |
| 2017/0193260 | A1 | 7/2017 | Prusik et al. |
| 2019/0197377 | A1 | 6/2019 | Studnicka |

FOREIGN PATENT DOCUMENTS

| | | |
|---|---|---|
| CN | 104250715 | 12/2014 |
| CN | 204155296 | 2/2015 |
| DE | 19912529 | 9/2000 |
| DE | 10325714 | 10/2004 |
| DE | 202005006301 | 6/2005 |
| DE | 102006004974 | 8/2007 |
| DE | 10 2013 011238 | 1/2015 |
| EP | 1319928 | 6/2003 |
| EP | 1645856 | 4/2006 |
| FI | 200300299 | 2/2003 |
| GB | 2430257 | 3/2007 |
| IN | 1280/CHENP/2004 | 5/2006 |
| JP | 2007-507260 | 3/2007 |
| JP | 2007285838 | 11/2007 |
| JP | 2013122341 | 6/2013 |
| JP | 2013-528536 | 7/2013 |
| JP | 5723474 | 5/2015 |
| KR | 101519317 | 5/2015 |
| WO | WO 2005/032449 | 4/2005 |
| WO | WO200550192 | 4/2006 |
| WO | WO200756752 | 5/2007 |
| WO | WO200806154 | 1/2008 |
| WO | WO200961831 | 5/2009 |
| WO | WO201061134 | 6/2010 |
| WO | WO201078422 | 7/2010 |
| WO | WO201085755 | 7/2010 |
| WO | WO 2011/127279 | 10/2011 |
| WO | WO201302552 | 1/2013 |
| WO | WO201390407 | 6/2013 |
| WO | WO2014102556 | 7/2014 |
| WO | WO2014153476 | 9/2014 |
| WO | WO2015113086 | 8/2015 |
| WO | WO2016160912 | 10/2016 |

OTHER PUBLICATIONS

S.A. Vanstone et al., "An Introduction to Error Correcting Codes with Applications", 1989, p. 219.
FreshCode TTI Labels—Varcode.
GSI General Specifications, V15, Issue 2, Jan. 2015, http://www.gs1.org/docs/barcodes/GS1_General_Specifications.pdf.
Tanguy, et al., "Enhanced Radio Frequency Biosensor for Food Quality Detection Using Functionalized Carbon . . . ", ACS Appl. Mater. Interfaces, 2015, 7 (22), pp. 11939-11947.
Wu, et al., "3D-printed microelectronics for integrated circuitry and passive wireless sensors", Microsystems & Nanoengineering 1, Article No. 15013 (2015).
Yang, "3D-printed 'smart cap' uses electronics to sense spoiled food", Jul. 20, 2015, UC Berkeley, http://news.berkeley.edu/2015/07/20/3d-printed-electronic-smart-cap/.
Wan, A new type of TTI based on an electrochemical pseudo transistor, Journal of Food Engineering, vol. 168, Jan. 2016, pp. 79-83.
News: New 3D technique . . . Aug. 15, 2015, AIPIA Active & Intelligent Packaging Industry Assoc., http://www.aipia.info/news-New-3D-technique-Prints-Embedded-Smart-Cap--Sensor-444.php.
http://www.businesswire.com/news/home/20151013005396/en/3615067/Palladio-Group-Ink-Introduce-PhutureMed%E2%84%A2-Advanced-Packaging.
Search Report and Written Opinion dated Aug. 5, 2016 issued for International PCT Application No. PCT/US16/24884 filed: Mar. 30, 2016.
Windl, et al., "Reactivable passive radio-frequency identification temperature indicator" J. Appl. Phys. 117, 17C125 (2015).
Search Report and Written Opinion dated Jul. 26, 2018 issued for International PCT Application No. PCT/US18/23068 filed: Mar. 19, 2018.
Search Report and Written Opinion dated Dec. 15, 2020 issued for International PCT Application No. PCT/US20/44081 filed on Jul. 29, 2020.
"Structure and Performance of Plastic Flexible Packaging Materials", edited by Li Dongli, China Light Industry Press, Mar. 2015.
International Search Report and Written Opinion dated Mar. 21, 2024 issued for International PCT Patent Application No. PCT/US24/13452.

* cited by examiner

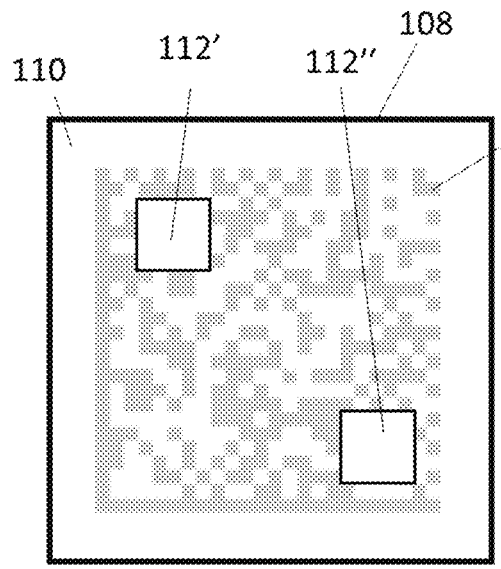
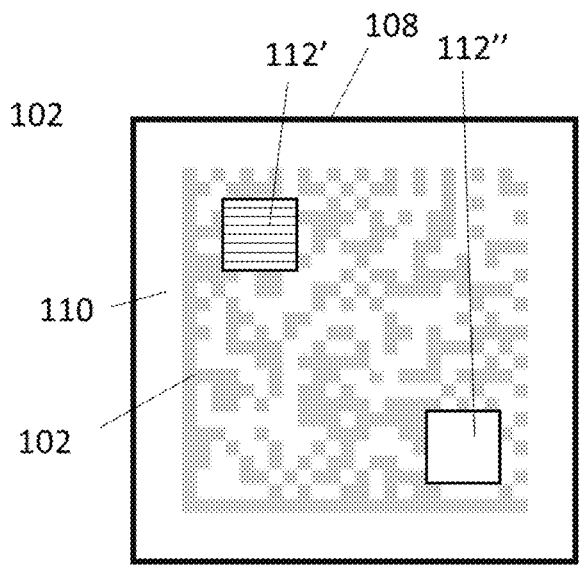
FIG. 6A  FIG. 6B
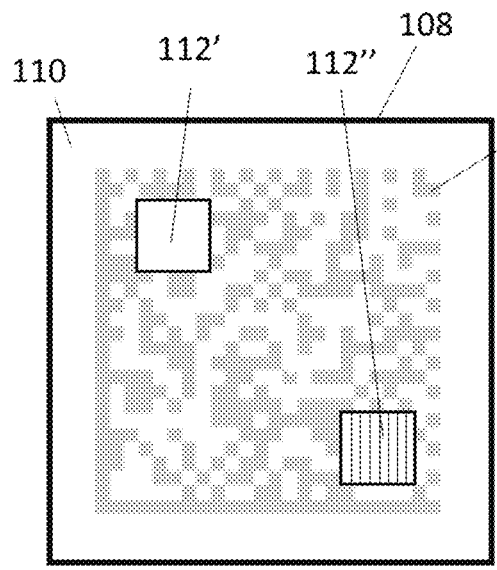
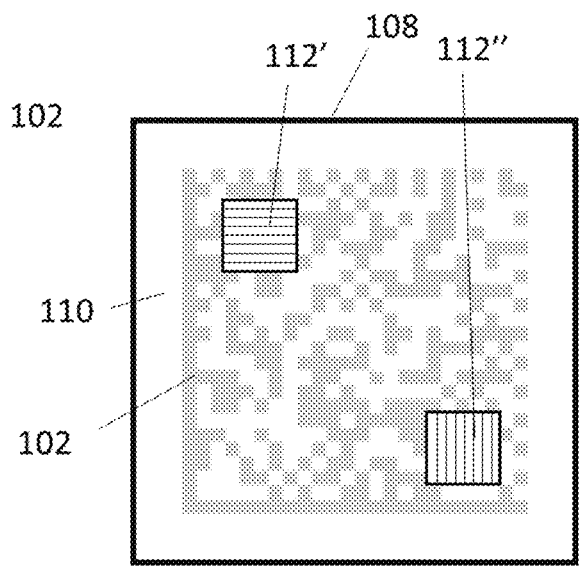
FIG. 6C  FIG. 6D

2D BAR CODE USING ACTIVE OVERLAYS

BACKGROUND

Many types of products are perishable under different environmental conditions. For example, products may be degraded or rendered unsafe or otherwise unusable by too much heat exposure cumulatively over time or peak heat exposure over a threshold that rapidly causes product deterioration, such as denaturing the proteins of a biologic product or thawing of a frozen product. Other products may be negatively impacted by being too cold, e.g., by freezing or other undesirable physical changed caused by too low a temperature. Many types of indicators are used to show historical exposure to environmental conditions, e.g., to low or too high a temperature, often in a visible manner, such as by change of color of an indicator material.

Certain types of thermochromic materials, often referred to as memory thermochromic materials, exhibit semi-irreversible color changes in response to changing temperature. These materials exhibit a color changing hysteresis effect, changing to a high temperature color state when heated above a high temperature threshold, with the color state being maintained when the material returns to a temperature below that threshold. The material then changes to a low temperature color state only when the temperature reduces sufficiently far below a low temperature threshold. The material then remains in the low temperature color state until the material returns to a temperature above the high temperature threshold. For example the material may be light colored in the low temperature state and dark colored in the high temperature state, or vice versa, or the material may be transparent or invisible in the high temperature state, and colored or visible in the low temperature state, or vice versa.

Likewise, other types of thermochromic materials exhibit irreversible color changes in response to changing temperature. These materials also exhibit a color changing hysteresis effect, changing to a high temperature color state when heated above a high temperature threshold, with the color state being maintained when the material returns to a temperature below that threshold or changing to a low temperature color state when cooled below a low temperature threshold, with the color state being maintained when the material returns to a temperature above that threshold.

Yet other materials can act similarly in response to other environmental stimuli such as exposure to particular substances, exposure to a predetermined amount of radiation, or exposure to a predetermined humidity level.

Environmental exposure indicators have been combined with both one- and two-dimensional bar codes as part of the label manufacturing process, for example, by printing indicators on a label with a bar code symbol, or by printing a bar code symbols on label stock which has environmental indicators preprinted upon it.

SUMMARY

Example apparatus are disclosed herein for an activatable two-dimensional ("2D") bar code with an overlay including an environmental exposure indicator. Also disclosed are methods for adding an environmental exposure indicator to a package containing a bar code.

In light of the disclosure herein and without limiting the disclosure in any way, in a first aspect of the present disclosure, which may be combined with any other aspect listed herein unless specified otherwise, an environmental exposure indicator comprises a base substrate, a bar code symbol on the base substrate; the bar code symbol having a bar code symbology and a plurality of cells assigned values and arranged in a matrix that encode data values according to the bar code symbology, and an overlay mechanically coupled to the base substrate covering at least a portion of the bar code symbol. The overlay has a transparent substrate and an environmental exposure indicator material on the transparent substrate where the environmental exposure indicator material has an initial color state and at least one other color state. The environmental exposure indicator material transitions from the initial color state to the at least one other color state in response to exposure to a predetermined environmental stimulus. Additionally, the overlay is coupled to the base substrate in a position where the environmental exposure indicator material covers at least a portion of the bar code symbol. When the environmental exposure indicator material is in either the initial color state or at least one other color state, the bar code symbol is readable.

In another aspect of the present disclosure, which may be used in combination with any other aspect or combination of aspects listed herein, the environmental exposure indicator material covers at least one cell in the matrix, so that a change in the color state of the environmental exposure indicator material from the initial color state to the at least one other color state changes the value of the at least one cell in the matrix when the bar code symbol is interpreted using the bar code symbology.

In another aspect of the present disclosure, which may be used in combination with any other aspect or combination of aspects listed herein, the environmental exposure indicator material covers at least one cell in the matrix, so that a change in the color state of the environmental exposure indicator material from the initial color state to the at least one other color state changes the value of the at least one cell in the matrix. Additionally, error correction codes in the bar code symbology mask the change of value of the at least one cell, so that data read from the bar code symbol in accordance with the bar code symbology does not change in response to change of the environmental indicator material color state from the initial color state to the at least one other color state that changes the value of the at least one cell.

In another aspect of the present disclosure, which may be used in combination with any other aspect or combination of aspects listed herein, a registration mark is affixed on at least one of the base substrate or the overlay and the registration mark identifies correct relative positioning of the base substrate and the overlay.

In another aspect of the present disclosure, which may be used in combination with any other aspect or combination of aspects listed herein, at least one registration mark is affixed to the base substrate and at least one registration mark is affixed to the overlay and the registration marks together identify correct relative positioning of the base substrate and the overlay.

In another aspect of the present disclosure, which may be used in combination with any other aspect or combination of aspects listed herein, the predetermined environmental stimulus is chosen from a list consisting of temperature excursion above a predetermined temperature threshold, temperature excursion below a predetermined temperature, cumulative exposure to temperature over a time period above a predetermined threshold, exposure to a particular chemical, exposure to a at least a predetermined amount of radiation of a particular type, and exposure to a humidity level above a predetermined threshold.

In another aspect of the present disclosure, which may be used in combination with any other aspect or combination of aspects listed herein, the bar code symbology is selected from the group consisting of Aztec Code, Code 1, Cronto-Sign, CyberCode, DataGlyphs, Datastrip code, Data Matrix, EZcode, High Capacity Color Barcode, InterCode, Maxi-Code, MMCC, NexCode, PDF417, QR Code, ShotCode, SPARQCode, and Dot Code symbologies.

In another aspect of the present disclosure, which may be used in combination with any other aspect or combination of aspects listed herein, the bar code symbol encodes a Stock Keeping Unit.

In another aspect of the present disclosure, which may be used in combination with any other aspect or combination of aspects listed herein, a second environmental exposure indicator material is affixed to the overlay.

In another aspect of the present disclosure, which may be used in combination with any other aspect or combination of aspects listed herein, the predetermined environmental stimulus for the environmental exposure indicator material is temperature excursion at a predetermined temperature threshold and the predetermined environmental stimulus for the second environmental exposure indicator material is cumulative exposure to a temperature over a time period.

In another aspect of the present disclosure, which may be used in combination with any other aspect or combination of aspects listed herein, the environmental exposure indicator material and the second environmental exposure indicator material respond to the same type of environmental stimulus with different exposure thresholds.

In another aspect of the present disclosure, which may be used in combination with any other aspect or combination of aspects listed herein, the transition between the initial color state and the at least one other color state is irreversible after exposure to the predetermined environmental stimulus.

In another aspect of the present disclosure, which may be used in combination with any other aspect or combination of aspects listed herein, after exposure to the predetermined environmental stimulus ceases, the environmental exposure indicator material transitions from the at least one other color state to the initial color state.

In another aspect of the present disclosure, which may be used in combination with any other aspect or combination of aspects listed herein, the environmental exposure indicator material is comprised of ultraviolet active pigments.

In another aspect of the present disclosure, which may be used in combination with any other aspect or combination of aspects listed herein, the environmental exposure indicator material change from the initial color state to the at least one other color state is only detectable when the environmental exposure indicator material is exposed to ultraviolet light.

In another aspect of the present disclosure, which may be used in combination with any other aspect or combination of aspects listed herein, the environmental exposure indicator material is comprised of infrared active pigments.

In another aspect of the present disclosure, which may be used in combination with any other aspect or combination of aspects listed herein, a color reference area is affixed to the overlay.

In another aspect of the present disclosure, which may be used in combination with any other aspect or combination of aspects listed herein, the environmental exposure indicator material is configured so that the bar code symbol is a color reference for the change from the initial color state to the at least one other color state.

In another aspect of the present disclosure, which may be used in combination with any other aspect or combination of aspects listed herein, the bar code symbology contains no information related to the environmental exposure indicator.

In another aspect of the present disclosure, which may be used in combination with any other aspect or combination of aspects listed herein, the transition between the initial color state and the at least one other color state is gradual and changes over time.

In another aspect of the present disclosure, which may be used in combination with any other aspect or combination of aspects listed herein, the environmental indicator material obscures at least a portion of the bar code symbol in at least one of the initial color state or the one other color state.

In another aspect of the present disclosure, which may be used in combination with any other aspect or combination of aspects listed herein, the at least one other color state is colorless, white, or transparent.

Aspects of the subject matter described herein may be useful alone or in combination with one or more other aspects described herein. In another aspect of the present disclosure, which may be used in combination with any other aspect or combination of aspects listed herein, an article of manufacture comprises a perishable host product, a package containing the perishable host product, and a bar code symbol on the package. The bar code symbol has a bar code symbology and a plurality of cells assigned values and arranged in a matrix that encode data values according to the bar code symbology. Additionally, an overlay is mechanically coupled to the package covering at least a portion of the bar code symbol, the overlay having a transparent substrate and an environmental exposure indicator material on the transparent substrate. The environmental exposure indicator material has an initial color state and at least one other color state and the environmental exposure indicator material transitions from the initial color state to the at least one other color state in response to exposure to a predetermined environmental stimulus. The overlay is coupled to the package in a position where the environmental exposure indicator material covers at least a portion of the bar code symbol. When the environmental exposure indicator material is in either the initial color state or at least one other color state, the bar code symbol is readable.

In another aspect of the present disclosure, which may be used in combination with any other aspect or combination of aspects listed herein, the perishable host product has a predetermined specified exposure limit for the predetermined environmental stimulus. The environmental exposure indicator material is configured so that the environmental exposure indicator material transitions from the initial color state to the at least one other color state whenever the environmental exposure indicator material is exposed to the predetermined environmental stimulus beyond the predetermined specified exposure limit.

In another aspect of the present disclosure, which may be used in combination with any other aspect or combination of aspects listed herein, the at least one other color state is colorless, white, or transparent.

Aspects of the subject matter described herein may be useful alone or in combination with one or more other aspects described herein. In another aspect of the present disclosure, which may be used in combination with any other aspect or combination of aspects listed herein, a method for adding an environmental exposure indicator to a pre-existing bar coded package, comprises receiving a package for a perishable host product, the package displaying a bar code symbol; and at a later time and a different location than where bar code was applied to the package, attaching an overlay containing a transparent substrate and an environmental exposure indicator material to the package so that the environmental exposure indicator material covers at least a portion of the bar code symbol, the environmental exposure indicator material configured to transition from an initial color state to at least one color state in response to exposure of the package to a predetermined environmental stimulus.

In another aspect of the present disclosure, which may be used in combination with any other aspect or combination of aspects listed herein, the method further includes after receiving the package, and before attaching the overlay, inserting the perishable host product in the package.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 6A illustrates a front view of the environmental exposure indicator with two environmental exposure indicator materials where each environmental exposure indicator responds to different predetermined environmental stimuli and neither environmental exposure indicator material has been exposed to the corresponding predetermined environmental stimulus nor been activated.

FIG. 6B illustrates a front view of the environmental exposure indicator with two environmental exposure indicator materials where each environmental exposure indicator responds to different predetermined environmental stimuli and one environmental exposure indicator material has been exposed to a predetermined environmental stimulus and has been activated and the other environmental exposure indicator material has not been exposed to the second predetermined environmental stimulus and has not been activated.

FIG. 6C illustrates a front view of the environmental exposure indicator with two environmental exposure indicator materials where each environmental exposure indicator responds to different predetermined environmental stimuli and one environmental exposure indicator material has not been exposed to the second predetermined environmental stimulus and has not been activated and the other environmental exposure indicator material has been exposed to a predetermined environmental stimulus and has been activated.

FIG. 6D illustrates a front view of the environmental exposure indicator with two environmental exposure indicator materials where each environmental exposure indicator responds to different predetermined environmental stimuli and both environmental exposure indicator material have been exposed to the corresponding predetermined environmental stimuli and both environmental exposure indicator materials have been activated.

DETAILED DESCRIPTION

Figure 1:
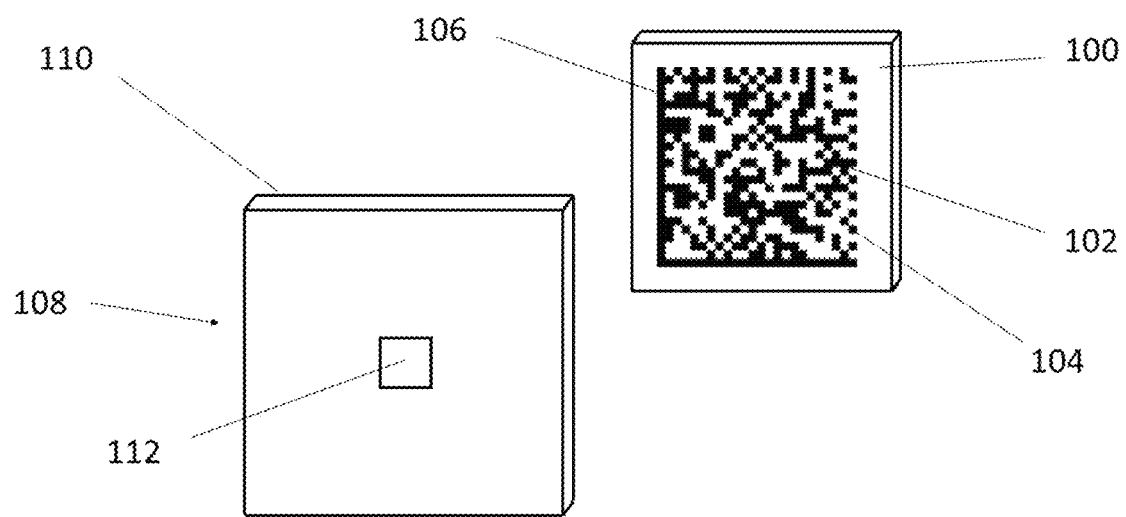
FIG. 1 illustrates an exploded view of an environmental exposure indicator.

As historical environmental exposure indicators and other types of temperature indicators gain broader use, it is desirable to allow them to be added to product labels or packaging (or customized if already present) at the time after the labels and/or packaging are manufactured. This allows for pre-labeled packages to provide dynamic data related to a host product's environmental exposure history in addition to the static data provided for on the bar code symbol. This capability can be provided without altering the process by which bar codes are provided on packaging or labels, and may be provided at a different point in the supply chain, for example at different time and/or place than where bar codes are provided on the packaging.

As bar codes contain static data and environmental exposure indictors contain dynamic data, the two can be combined to provide more complete information regarding a product. When an environmental exposure indicator is placed atop a bar code, the static and dynamic data can even be read simultaneously by one scanning device. Environmental exposure indicators provided in combination with bar codes do exist in the prior art. However, when the environmental exposure indicator is over printed by the bar code, the environmental exposure indicator may be difficult for the scanning device to read as it is obscured by the bar code. The printing process may also affect the environmental exposure indicator, e.g., by exposure to high temperatures. Even where printing the environmental exposure indicator after the bar code avoids these issues, modifications to the packaging production, packaging, labeling or similar processes may be required. Thus, a need exists for the ability to effectively convey both static and dynamic data on a product without altering existing product label and packaging printing and production processes. An approach for combining the static data encoded into the bar code with dynamic data such as information regarding the environment the product is presently disclosed.

The apparatus, systems, methods, and techniques described herein generally concern a bar code symbol combined with an overlay containing an environmental exposure indicator material.

As used herein, "static data" refers to data values encoded on a bar code that reference the product to which the bar code is affixed. Static data values are fixed data values that do not change over time or in response to environmental exposure. These data values may include information referencing a product whose label or package includes the bar code, e.g., Stock Keeping Units ("SKUs") or predetermined expiration dates. In this regard, static data contains no information directly related to the environment in which the bar code or product bearing it is actually kept.

As used herein, "dynamic data" refers to data values that change over time. This may include data regarding an environment exposure history such as temperature, humidity, light exposure, radiation exposure, and the like. Dynamic data can be captured through environmental exposure indicators applied to a perishable host product to track the product's exposure to an environmental condition. For example, (i) temperature sensitive products, such as frozen food product(s) may include an environmental exposure indicator that tracks the food product's exposure to temperatures above freezing, (ii) light sensitive products, such as film product(s) may include an environmental exposure indicator that tracks the film product's exposure to UV light, (iii) moisture sensitive products, such as semiconductors and other electronic product(s) may include an environmental exposure indicator that tracks the electronic product's exposure to humidity, etc. Access to dynamic data can be valuable in a variety of industries including, but not limited to, shipping, pharmaceuticals, and agriculture, e.g., in cold chain management.

The apparatus, systems, methods, and techniques described herein generally concern a bar code symbol combined with an overlay containing an environmental exposure indicator material.

A bar code is a visual representation of static data. Bar codes can be either one-dimensional ("1D") and represent data by varying the width and spacing of lines, or two-dimensional ("2D") by varying the height, width, and spacing of smaller components such as pixels. Black and white 2D bar codes can represent more data per unit area than 1D bar codes. It should be appreciated that the following detailed description may apply to both 1D and 2D bar codes. Even though several of the illustrative examples described herein refer to 2D bar codes, the described techniques and features may also similarly apply to 1D bar codes.

FIG. 1 illustrates a base substrate 100 bearing a bar code symbol 102. The base substrate 100 may be any material suitable for receiving and displaying the bar code, e.g., porous materials for bar codes printed using inks, etchable materials for laser-etched bar codes, paper, nylon, vinyl, other synthetic polymers such as polytetrafluoroethylene ("PTFE"), or other materials that are suitable for receiving and displaying the barcode. The base substrate 100 may, for example, be paper or film (e.g., nylon, vinyl, synthetic polymer material, carbon fiber, Teslin synthetic paper, polyethylene ("PE"), polypropylene ("PP"), polytetrafluoroethylene ("PTFE"), polyester, polyethylene, polyolefin, polyimide, vinyl, acrylic film, polypropylene, non-woven nylon, coated and non-coated direct thermal paper, printable polyethylene terephthalate ("PET"), oriented polypropylene ("OPP"), biaxially oriented polypropylene ("BOPP"). The base substrate 100 may be or may be part of a package or label for perishable host product as described below.

The bar code symbol 102 contains a plurality of cells 104 arranged in a matrix. Each cell 104 is assigned a value. The cells 104 may optionally be square, rectangular, or circular. The arrangement of cells 104 within the matrix encode static values. Static data may be encoded into the contrasting patterns by software, such as a computer application or printer firmware, and may be physically created by processes such as printing laser ablation.

Each cell 104 of the matrix may be used to encode one bit of static data. Each cell in the bar code symbol 102 is colored either nominally colored (e.g., black) or nominally empty or clear (e.g., white). For example, nominally colored cells 104 may be black when printed on a light base substrate 100 or may be a lighter color when printed on a dark base substrate 100. The nominally empty or clear cells 104 may not require any printing and may instead allow the base substrate to show through. It will be appreciated that the example approach may be extended to multi-color bar codes. The cell matrix is the visual manifestation of the binary bitmap matrix contained with the area of the symbol bounded by the Finder Pattern 110. The Finder Pattern 110 may be an 'L' formed by connected solid lines along two edges of the matrix (shown on the left and bottom edges of the bar code symbol 102 in FIG. 1), also termed a closed limitation line, with a Clock Track formed by an alternating pattern of white and black modules along the opposite edges of the symbol, and also termed an open border line (shown as the top and right edges of the bar code symbol 102 in FIG. 1). It will be appreciated that in other embodiments, other finder patterns may be employed. The bar code symbol may also include quiet spaces, regions surrounding a set of elements (e.g. finder patterns, clock tracks, cells), which is free of contrasting marks, to enable a scanning device to detect the bar code symbol 102 in a captured image. For example, in a Data Matrix bar code there must be an empty area at least one cell width wide surrounding the bar code symbol 102.

The manner in which static data is encoded in the bar code symbol 102, the arrangement of cells 104 within the bar code symbol 102, and any requirements for cells 104 and quiet space are defined by a set of rules, known as a bar code symbology. The bar code symbology may be, for example, Aztec Code, Code 1, CrontoSign, CyberCode, DataGlyphs, Datastrip code, Data Matrix, EZcode, High Capacity Color Barcode, InterCode, MaxiCode, MMCC, NexCode, PDF417, QR Code, ShotCode, SPARQCode, Dot Code symbologies, and the like. Even though several of the illustrative examples described herein refer to Data Matrix, the described techniques and features may also similarly apply to other bar code symbologies.

It should be appreciated that a 2D bar code of a 24×24 Data Matrix is provided in the figures are for illustration purposes only. A 24×24 Data Matrix contains 72 codewords, each formed of eight modules corresponding to the eight bits of the codeword, referred to as a "utah." The 24×24 bitmap matrix shows the layout of all the 72 codewords in a 24×24 Data Matrix. A "utah" is an arrangement of eight modules to encode one codeword. It may be arranged either as a single connected group with a pattern frequently in the shape of the State of Utah in Data Matrix, or formed as two subgroups of connected modules split across two or more utah patterns. The systems and methods described herein may apply to other Data Matrix sizes and other styles of 2D bar codes. For example, the Data Matrix may be 10×10, 12×12, 14×14, 40×40, up to 144×144 and may have 8, 12, 18, 162 or 2178 codewords respectively.

FIG. 1 also illustrates an overlay 108 which may be affixed to the base substrate 100 and bar code symbol 102. The overlay 108 may include a clear material, such as a plastic transparent substrate 110, and an environmental exposure indicator material 112. In one embodiment, the overlay 108 may be a chemical laminate. In yet another embodiment, the environmental exposure indicator material 112 may be covered by a coating to protect the environmental exposure indicator material 112 from environmental disturbances.

The overlay 108 may be affixed to the base substrate 100 by an adhesive. Particularly, if the adhesive is used across the surface of the overlay 108, a transparent adhesive may be needed. In some embodiments, the adhesive is applied directly to the base substrate 100. In other embodiments, the adhesive is pre-placed as an adhesive backing on the transparent substrate 110 of the overlay 108. In this example, the adhesive may cover the entire transparent substrate 110 or only a portion of the transparent substrate 110. The adhesive may be selected from a group consisting of an aqueous emulsion adhesive, an acrylic polymer or co-polymer, an amine salt of an acrylic co-polymer, a carnauba wax, a candelilla wax, a hydrocarbon wax, Neocryl A-1052, Neocryl BT-24, Neocryl B-818, Epotuf 91-263, Ottpol 25-50E, Ottopol 25-30, Joncryl 682, and Joncryl 538A. The adhesive can be attached manually by an operator, or by a machine. In some embodiments, the adhesive may be placed on a release liner to adhere to the base substrate 100.

Figure 2:
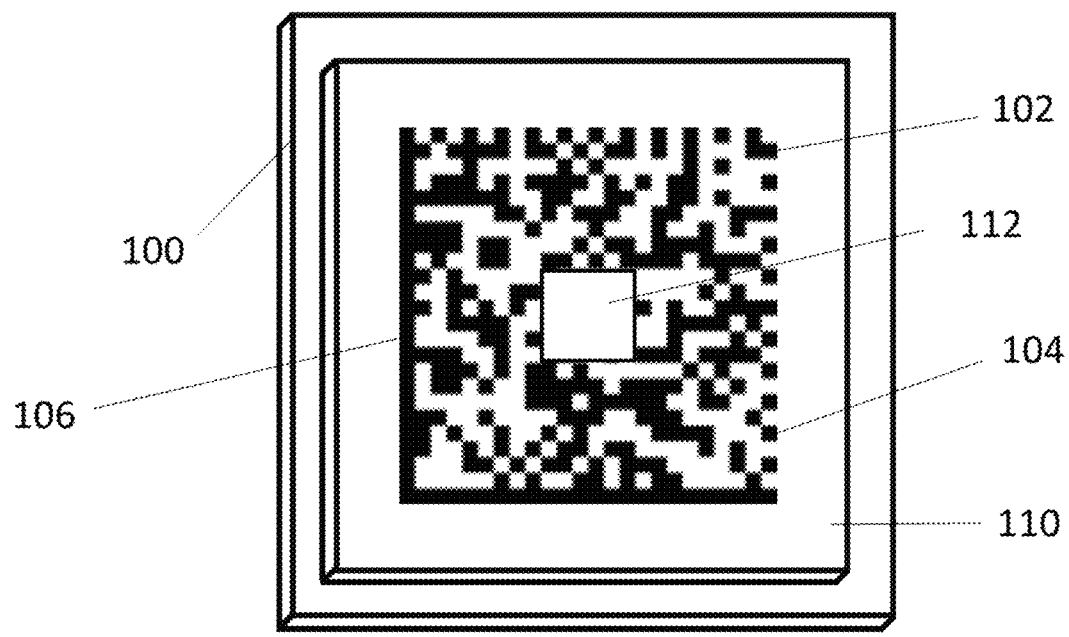
FIG. 2 illustrates a front view of an overlay affixed to a bar code symbol.

FIG. 2 illustrates the overlay 108 mechanically coupled to the base substrate 100 and bar code symbol 102. As a result, the overlay 108 can be affixed to an already-existing bar code symbol 102 and, as described below, the bar code symbol 102 can still be read by a scanning device. The symbology of bar code symbol 102 with the overlay 108, and the location of the active color-changing regions with respect to the underlying static bar code symbol can be configured and interpreted using methods described in U.S. Pat. No. 10,546,172 to Temptime Corporation.

The overlay 108 may include a transparent substrate 110 and an environmental exposure indicator material 112. The transparent substrate 110 allows the bar code symbol 102 to be fully visible underneath. If the bar code symbol 102 is obscured by the overlay 108, it is obscured only by the environmental exposure indicator material 112. The environmental exposure indicator material 112 may be adhered to the transparent substrate 110 in a variety of ways. For example, the environmental exposure indicator material 112 may be printed on the transparent substrate 110 using flexographic, screen, gravure, inkjet, or other printing processes. In other examples, the environmental exposure indicator material 112 is printed on the transparent substrate 110 via thermal transfer ribbon. It will be appreciated that in other embodiments, other methods of adhering the environmental exposure indicator material 112 to the transparent substrate 110 may be employed.

In some embodiments, the environmental exposure indicator material 112 covers at least one cell 104 in the matrix, so that, in some color states, the environmental exposure indicator material 112 may change the apparent value of the underlying cell 104 in the bar code matrix. For example, when the environmental exposure indicator material 112 is in an opaque dark state, it may change the apparent value of an underlying white or empty cell. When the environmental exposure indicator material 112 is in an opaque or dark color state, the transition into an opaque or dark color state changes the value of the at least one cell 104 in the 'matrix when the bar code symbol 102 is interpreted using the bar code symbology. It will be appreciated that the above-mentioned color state changes are purely exemplary and other color changes may exist. The environmental exposure indicator material 112 may transition from light to dark, dark to light, transparent to opaque, opaque to transparent, or any other combination thereof.

Many 2D bar code technologies provide robust error correction capabilities. This allows for a portion of the bar code symbol 102 to be obscured or misread and still the encoded data entirely readable by a scanning device. It should be appreciated that because of error correction capabilities, the overlay can advantageously be used within a 2D bar code without affecting the readability of the bar code symbol 102. Through the use of error correction, such as ISO 16022 Reed-Solomon Error Correction process, which corrects any erroneously identified cells, the underlying matrix is recovered. Thus, static data from the underlying matrix in accordance with the bar code symbology is advantageously processed in the standard manner without being corrupted by the continuously changing color of the environmental exposure indicator material as described below. Therefore, static data, such as a SKU, can be read from the bar code symbol while dynamic data, such as remaining product life, embedded within the bar code continuously changes due to environmental exposure.

Many types of error correcting codes may be used to encode digital information related to the perishable host product. Typically encoded is a dynamic indicator bit pattern of binary-encoded sensor data. Useful error correcting codes include Hamming Codes, Bose-Chaudhuri-Hocquenghem Codes, Golay Codes, Simplex Codes, Reed-Muller Codes, Fire Codes, Convolutional Codes, and Reed-Solomon Codes.

For a complete and normative description of the method of error correction employed in Data Matrix, see the current version of International Standard ISO/IEC 16022, "Information technology—Automatic identification and data capture techniques—Data Matrix bar code symbology specification."

The environmental exposure indicator material 112 may also be shaped such that the bar code symbol 102 requires minimal error correction to be read, which allows smaller bar code symbols 102 to be used than in previous implementations. For example, overprinting or underprinting with environmental exposure indicator materials 112 in a five-module by five-module patch may require error correction from five "utahs" where each utah contains eight modules, each of which forms one bit of either a data or error correction codeword. In contrast, bar codes with similar accuracy may be printed with environmental exposure indicator materials 112 entirely filling the empty area, which require error correction from two "utahs". Applying active ink to smaller environmental exposure indicator materials 112 advantageously reduces consumption or waste of active ink for dynamic 2D bar codes while ensuring the bar code symbol 102 provide sufficient cells and accuracy for the environmental exposure indicator material 112 while also leaving additional unused error correction codewords for use elsewhere in recovering the bar code data. It should be appreciated that other patterns and/or designs may be optimized to reduce waste, increase color accuracy, and reduce error correction needed for the 2D bar code.

Figure 3:
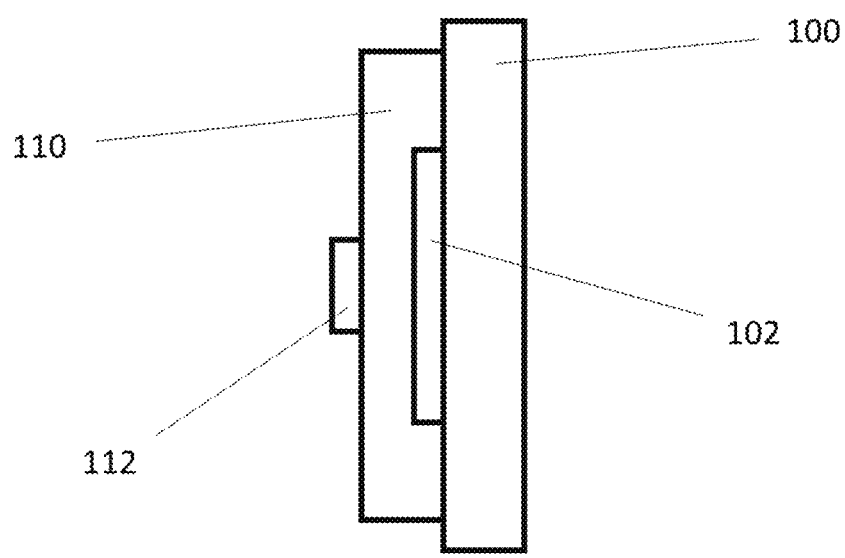
FIG. 3 illustrates a side view of the environmental exposure indicator.

While the environmental exposure indicator material 112 is shown as an overlayer that is printed on the transparent substrate 110 in FIG. 3, the overlay 108 could be positioned with the environmental exposure indicator material 112 above or below the transparent substrate 110. The environmental exposure indicator material 112 may also be an underlayer that is injected within or formed within the transparent substrate 110, or sandwiched between two transparent layers. Likewise, the bar code symbol 102 may be an overlayer that is provided on the base substrate 100, e.g., using various types of printing or ablation processes.

Affixing the overlay 108 over the bar code symbol 102 as part of an overlay has several potential advantages. First, since most perishable host products have pre-existing bar codes, customers or distributors of the perishable host products can later add an overlay containing dynamic data which can be customized to be read by a customer's personalized scanning devices.

Second, environmental indicators may need to be stored in controlled conditions to prevent them from prematurely aging or being triggered. For example, cumulative time temperature indicators are often stored in deep freeze conditions before being used on products. If a cumulative time temperature indicator were applied to a perishable host product's packaging, the entire packaging would then need to be stored in such conditions prior to use. By using a separate overlay 108, only the environmental exposure indicator material 112 and accompanying overlay 108 needs to be stored in carefully controlled conditions until the package is actually used with a perishable product, at which time the overlay 108 can be applied to the packaging.

Third, printing registration often, even when working as specified, has minor drift during the printing process that cannot be predicted by the user. By using the scanning device on the bar code symbol 102 after the printing process is completed, more accurate registration with the scanning device is possible with a post-printing overlay application of the environmental exposure indicator. In other words, tolerances to bar code registration are not as much of a worry for bar code printing when the scanning device region is determined after printing is completed. The registration of a bar code symbol 102 may be further facilitated by placing a registration mark on at least one of the base substrate 100 or the overlay 108 so that the registration mark identifying correct relative positioning of the base substrate 100 and the overlay 108. In another embodiment, two or more registration marks can be provided on the overlay 108 where the use of the registration marks together can identify the correct relative positioning of the base substrate 100 and the overlay 108.

The environmental exposure indicator material 112 is a material that changes state in a detectable way in response to a predetermined environmental stimulus. In an example, the environmental exposure indicator material 112 is configured to undergo a continuous chemical or physical state change between an initial state and at least one other state. Even though several of the illustrative examples described herein refer to the change in state as a change in color state, the described techniques and features may also similarly apply to other changes to the environmental exposure indicator material 112, the change of state may be a change in a property, e.g., an optical property, such as a reflectance value, saturation value, color value, color density value, optical density value or color hue value of the environmental exposure indicator material 112. In several of the examples described herein, changes in optical properties, such as changes in reflectance of the environmental exposure indicator material 112, are provided to describe the state change of the environmental exposure indicator material 112. It should be appreciated that the change of state may be a change in a property other than an optical property. Specifically, other property changes may apply to other embodiments described within the detailed description even though optical property changes are used as examples.

Environmental exposure indicator materials 112 respond to predetermined environmental stimuli. When the environmental exposure indicator materials 112 change a physical or chemical state based on exposure to an environmental stimulus, the environmental exposure indicator material 112 is said to be "activated." The predetermined environmental stimulus may be chosen from a list including, but not limited to, temperature excursion above a predetermined temperature threshold, temperature excursion below a predetermined temperature, cumulative exposure to temperature over a time period above a predetermined threshold, exposure to a particular type of light (e.g. ultraviolet or infrared light), exposure to a particular chemical, exposure to a predetermined amount of radiation of a particular type, exposure to a particular amount of pressure, exposure to a particular pH level, and exposure to a humidity level above a predetermined threshold. It will be appreciated that in other embodiments, other predetermined environmental stimuli beyond what is listed in this detailed description may be employed. Even though several of the illustrative examples described herein refer mostly to exposure to a predetermined temperature threshold, the described techniques and features may also similarly apply to other predetermined environmental stimuli.

As one example in the present disclosure, a predetermined temperature threshold may be used to determine if a perishable host product has been exposed to and/or maintained at temperature below an acceptable temperature or range of temperatures. To signal past exposure to a temperature below a predetermined threshold, environmental exposure indicator materials 112 according to the present disclosure usefully can have one observable appearance while the environmental exposure indicator material 112 is maintained at an acceptable range of temperatures above a low temperature threshold, and a different observable appearance after the environmental exposure indicator material 112 has been exposed to a temperature below the low temperature threshold. This observable change may include having an indicia appear that indicates the indicator has had a low temperature excursion, having an indicia indicating the indicator has not been exposed to such a low temperature disappear, or a change in color or other appearance of an indicia. This observable change can be provided by a thermochromic composition that changes color states in response to temperature exposure below the low temperature threshold.

As another example in the present disclosure, a predetermined temperature threshold may be used to determine if a perishable host product has been maintained at an acceptable temperature range or has been exposed to temperature excursion above a high temperature threshold. To signal past exposure to a temperature above a predetermined threshold, environmental exposure indicator materials 112 according to the present disclosure usefully can have one observable appearance before exposure to a temperature at or above the threshold and a different observable appearance after exposure of the environmental exposure indicator material 112. This observable change may include having an indicia appear that indicates the indicator has had a high temperature excursion, having an indicia indicating the indicator has not been exposed to such a high temperature disappear, or a change in color or other appearance of an indicia. This observable change can be provided by a thermochromic composition that changes color states in response to temperature exposure above the high temperature threshold. Examples of thermochromic compositions include the various cumulative and threshold heat exposure indicator materials disclosed in U.S. Pat. No. 10,031,086 to Temptime Corporation, which may be configured to change color states in response to temperature exposure.

In some examples, the temperature threshold for activation of the thermochromic compositions may be from about 0° C. to 70° C., from about 6° C. to 12° C., and from about 35° C. to 50° C. Common high temperature excursion thresholds include about 0° C., corresponding to maintaining a frozen state, about 10° C. (around the range of common refrigerator temperatures), and various warmer thresholds, such as 35° C., 37° C., 45° C., and 50° C., which correlate with damage to various sorts of biologic materials.

As an alternative to temperature excursions, in other embodiments the environmental exposure indicator material 112 may be responsive to cumulative exposure to a predetermined temperature over a time period. In this example, the environmental exposure indicator material 112 would only change color states in response to having been exposed to a predetermined temperature for a predetermined time period. This environmental stimulus is particularly valuable for perishable host products that can be exposed to various conditions for short periods of time and remain suitable for use. One such example is insulin which may be stored for up to 28 days at room temperature. Utilization of an environmental exposure indicator material 112 on insulin packaging could allow a user to determine the long-term and short-term storage conditions and viability of the product.

In yet another embodiment, the environmental exposure indicator material 112 may be responsive to multiple environmental stimuli. For example, certain diacetylenes, which are responsive to both temperature and ultraviolet light.

Environmental exposure indicator materials 112, such as environmentally sensitive materials may be provided as a compound, ink, toner, dye, paint or wax with environmentally sensitive pigments. In some examples, the environmental exposure indicator material 112 may be selected from the group of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the thermochromic composition may be one of leuco dye (e.g. U.S. patent application Ser. No. 17/508,206), a micro-encapsulated leuco-dye, microencapsulated leuco pigments (basic components of thermochromic microcapsules include dye, developer, and solvent), an SCC Polymer, a water-based SCC polymer emulsion, liquid crystal, inorganic materials, a diacetylene (e.g. U.S. patent application Ser. No. 17/867,042), an alkane, a wax, an ester or combinations thereof. In other embodiments, the environmental exposure indicator material 112 may be one of polyoxymethylenemelamine, maleate polymer, ODB-II, Green DCF, Behenic acid methylester, resin, color modifier, bisphenol A derivative, leuco dye, and UV absorber. In yet other embodiments, the pigment used within the environmental exposure indicator material 112 may be ultraviolet active pigments or infrared active pigments. It should be appreciated that the environmental exposure indicator material 112 may be extended to other compositions beyond those listed. In an embodiment, the thermochromic compositions may also be available in pigment powder form, water-based ink or slurry matrixes. For example, a water based slurry having the components: melamine formaldehyde resin, 3-diethylamino-6-methyl-7,2,4-xylidinofluoran, water, and aromatic ester may be used.

The environmental exposure indicator material 112 has a chemistry that is predictably responsive to a predetermined environmental stimulus, undergoing a chemical or physical state change between an initial color state and at least one other color state. The environmental exposure indicator material 112 may change from a darker color to a lighter color, a lighter color to a darker color, may change levels of transparency or opacity, and/or may change levels of reflectivity or absorptivity, or may change any other suitable characteristic. Additionally, the environmental exposure indicator material 112 may continuously change between a range of from an initial color state to at least one other color state. For example, the environmental exposure indicator material 112 may change from a lighter color to a dark blue, which may be alternatively transformed by a scanning device to values on continuous "greyscale". The greyscale (which is not necessary truly grey but is a continuous tone of some hue) is determined reducing the R, G and B values of each pixel to a single greyscale value by a formula of form:

$$\text{Greyscale value}=(aR+bG+cB)/K$$

Where {a, b, c} represent the relative contribution of each sRGB color in the pixel, and K is scaling factor. Additionally, the environmental exposure indicator material 112 may continuously change from a white or clear color to a dark red or blue (e.g., changing from white, to a faint red, become less and less opaque until it reaches a solid red color at the end color state). Moreover, any suitable combination of colors may be used for the color states of the environmental exposure indicator material 112.

Figure 4A:
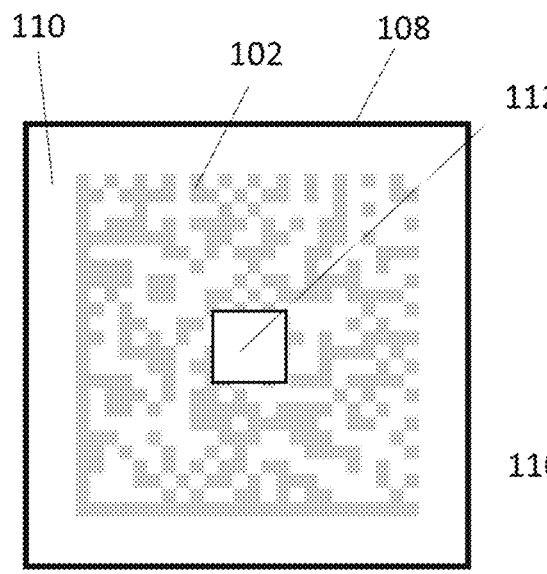
FIG. 4A illustrates a front view of the environmental exposure indicator where the environmental exposure indicator material has not been exposed to a predetermined environmental stimulus and the environmental exposure indicator material has not been activated.
Figure 4B:
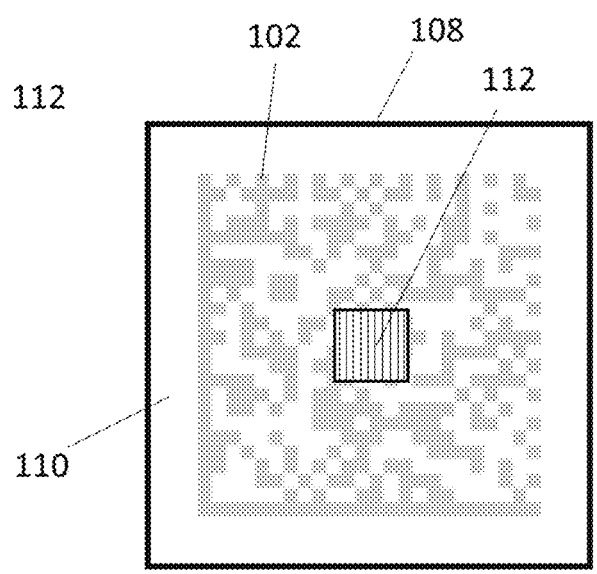
FIG. 4B illustrates a front view of the environmental exposure indicator where the environmental exposure indicator material has been exposed to the predetermined environmental stimulus and the environmental exposure indicator material has been fully activated.
Figure 5A:
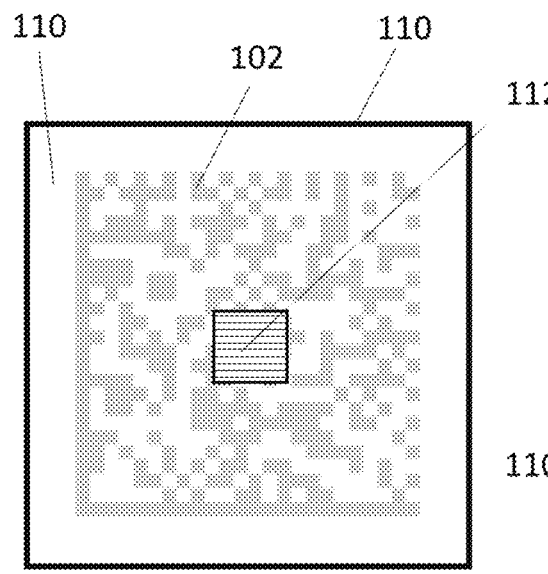
FIG. 5A illustrates a front view of the environmental exposure indicator where the environmental exposure indicator material has not been exposed to a predetermined environmental stimulus and the environmental exposure indicator material has not been activated.
Figure 5B:
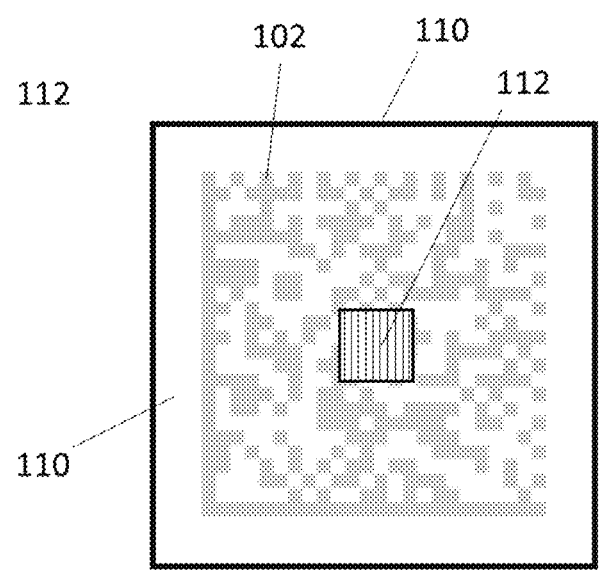
FIG. 5B illustrates a front view of the environmental exposure indicator where the environmental exposure indicator material has been exposed to the predetermined environmental stimulus and the environmental exposure indicator material has been fully activated.

FIGS. 4A-5B illustrate two examples of environmental exposure indicator materials 112 at different levels of exposure to a predetermined environmental stimulus. A first example is shown in FIGS. 4A-4B. In FIG. 4A, the environmental exposure indicator material 112 is shown in an initial color state that may be clear, white, or transparent. From the initial color state, the environmental exposure indicator material 112 may become more opaque and change to a plurality of intermediate color states where the environmental exposure indicator material 112 changes to a faint color and becomes even more opaque until it reaches a solid color at the end state, represented in red in FIG. 4B. In this example, the environmental exposure indicator material 112 may continuously (as contrasted with step-wise) change color state and become a more vibrant red color in response to a predetermined environmental stimulus. In the second example illustrated in FIGS. 5A-5B, the environmental exposure indicator material 112 may transition from one color to another. FIG. 5A displays the environmental exposure indicator material 112 at an initial color state, represented in blue. When exposed to a predetermined environmental stimulus, the blue color in the initial color state transitions to another color state, illustrated as red in FIG. 5B. When the environmental exposure indicator material 112 is in transition from a first to second color state, the intermediate color states may be indistinguishable or a combination of colors (e.g. the intermediate color state may be purple if the initial color state is blue and the end color state is red).

An environmental exposure indicator with the environmental exposure indicator material 112 in an initial state may represent an associated product that has 100% remaining life. For example, an environmental exposure indicator may be an indicator on a medical product (e.g., inactivated Polio vaccine) that may be scanned to reveal product lifetime data, such as a Monitor Category: VVM7 ("vaccine vial monitor" with a nominal L=7 day usage life), 80 percent life remaining, and expiration date (e.g., calculated from the estimated remaining life or based on some other criteria). As another example, an overlay 108 can be added to a food product, such as a milk carton, at a manufacturing plant. The environmental exposure indicator material 112 may then be scanned by a scanning device to reveal whether the milk carton had been overly exposed to warm temperatures that would spoil the milk. Additionally, the static data from the bar code symbol 102 may include sensor information such that the reader is automatically provided with the appropriate equation parameters and inputs to calculate the remaining product life according to the current color state of the environmental exposure indicator material 112. For example, after reflectance data is obtained from the image sensor, the appropriate equation parameters can be used to determine the equivalent exposure time at a predetermined temperature threshold. Then subtracting the equivalent exposure time at the predetermined temperature threshold from the lifetime gives the remaining product life at the predetermined temperature threshold.

As discussed above, the environmental exposure indicator material 112 may transition between an initial color state and an end color state. For example, the environmental exposure indicator material 112 may change from clear or colorless in the initial color state to a faint color in the intermediate color state. To ensure accuracy of product life calculations, the 2D bar code symbol 102 may be encoded such that a threshold value of opacity or reflectance in the environmental exposure indicator material 112 is identified as the end of the product life. For example, the bar code symbol 102 may be encoded such that the reader determines that the environmental exposure indicator material 112 reaching an end state reflectance is expired, which may allow a reader to determine how long a product has been expired.

For example, if the product expiration was set at the final reflectance percentage end state of the environmental exposure indicator material 112, then the rate of change of reflectance may be too slow to practically determine when the environmental exposure indicator material 112 had reached the end state. However, if the expiration is set at an intermediate color state, which is before the end state, the environmental exposure indicator material 112 may be configured to also provide information about cumulative exposure to a predetermined environmental stimulus after expiration.

The environmental exposure indicator material 112 may then transition from the intermediate color state to an end color state or to a second intermediate color state (e.g., the expired state) before the end color state. The end color state may be used as the threshold value that indicates that the perishable host product has exceeded its suitable life. This transition may occur gradually in response to the predetermined environmental stimulus over time. The environmental exposure indicator material 112 may be carefully tuned so that the response of the perishable host product is similar to that of a perishable host product to be monitored, so that the environmental exposure indicator material 112 transitions to a particular state at a time when the perishable host product should be judged no longer acceptable and should be discarded, rather than used. For example, the reader may display "Test Failed". Due excessive exposure to time, temperature, or both time and temperature, the product may have no remaining life. Regardless of the color state of the environmental exposure indicator material 112, the static bar code symbol 102 advantageously carries the same static data and carries the parameters necessary to implement the remaining life equation.

Further, the chemical or physical state change of the environmental exposure indicator material 112 may be a continuous state change, causing a continuous irreversible change in the color state of the environmental exposure indicator material 112 or a reversible color state in the environmental exposure indicator material 112 change once the predetermined environmental stimulus crosses a predefined threshold such as a predetermined temperature threshold. In an irreversible color change, the environmental exposure indicator material 112, after being exposed to the predetermined environmental stimulus, would transition from its initial color state to an end color state and would remain in the end color state regardless of the environmental stimulus thereafter. In a reversible color change, once exposure to the predetermined environmental stimulus ceases, the environmental exposure indicator material 112 transitions from the current color state to the initial color state.

The bar code symbol 102 and the environmental exposure indicator materials 112 or a combination of the bar code symbol 102 and the environmental exposure indicator materials 112 may be optically readable by a scanning device and readable by a human. In another example, one of the bar code symbols 102 and the environmental exposure indicator materials 112 may be readable by a scanning device and unreadable to a human. Additionally, both the bar code symbol 102 and environmental exposure indicator materials 112 may not be human readable (e.g., the environmental exposure indicator material 112 is in the ultraviolet ("UV") spectrum by containing an ultraviolet active pigment and is unreadable by a human). Specifically, the bar code symbol 102 may be entirely human visible, only the environmental exposure indicator material 112 may be human visible, or none of the bar code symbol 102 may be human visible. Additionally, the readability and human visibility of the bar code symbol 102 and environmental exposure indicator material 112 may only be detectable in one of the environmental exposure indicator material's 112 color states.

As shown in FIGS. 6A-6D, the overlay 108 may include multiple environmental exposure indicator material portions 112. Each environmental exposure indicator material portion 112 may include a different environmental exposure indicator material 112. In another example, an environmental exposure indicator material portion 112 may include multiple environmental exposure indicator materials 112. For example, the environmental exposure indicator material portion 112 may include two different environmental exposure indicator materials 112 that are adjacent to each other in the environmental exposure indicator material portion 112. Each of the environmental exposure indicator materials 112 may change in response to or exposure to different environmental conditions as shown in FIGS. 6B and 6C. Specifically, the environmental exposure indicator material(s) 112 may include various components that are triggered or react at different exposure levels or to different predetermined environmental stimuli.

In an example, the environmental exposure indicator material(s) 112 may include two different dynamic compositions. For example, each environmental exposure indicator material 112 may include one or more dynamic inks. Alternatively, different environmental exposure indicator material 112 may be designated for different dynamic inks (e.g., environmental exposure indicator material 112' may contain a first dynamic ink while environmental exposure indicator material 112" may contain a second dynamic ink). Each of the dynamic inks may change in response to or exposure to a different predetermined environmental stimulus. For example, an environmental exposure indicator material 112 may be used on a perishable host product that can spoil based on levels of temperature or ultraviolet exposure. The overlay 108 may include an environmental exposure indicator material 112 with two different dynamic inks adjacent to one other (e.g., one environmental exposure indicator material 112' may monitor ultraviolet light exposure while another environmental exposure indicator material 112" may monitor temperature exposure). In another example, the overlay 108 may include environmental exposure indicator materials 112 that respond to the same type of environmental stimulus, but respond at different thresholds (e.g. one environmental exposure indicator material 112' may monitor temperature exposure over 40° C., while another environmental exposure indicator material 112" may monitor temperature exposure up over 50° C.).

To further improve the accuracy of cumulative indicators, and to give a point of calibration, both digital and visual, a color reference area can be added to the overlay 108. In some embodiments, the color reference area is added in an exterior area of bar code symbol 102. Advantageously, scanning devices may be calibrated by the color reference areas to determine if the perishable host product no longer has remaining life. The scanning device may use a color reference within the color reference area and compare that color reference to the color state of the environmental exposure indicator material 112. In this example, when the sensor area reaches the same color shade as the color reference area, the perishable host product the bar code symbol 102 is printed on would be deemed to be at endpoint.

The one or more color reference areas of a known optical property, such as a known reflectivity, can be used in auto-calibration of the scanning device at the reading color of interest. The color reference areas may be positioned adjacent to the bar code symbol 102. The color reference areas may be printed as part of the base substrate 100 or transparent substrate 110 and may appear adjacent to specific cell positions within the sensor-augmented bar code symbol 102. The color reference area color corresponds to the change of the environmental exposure indicator material 112 from one color state to another color state.

The color reference areas may be used in assessing the environmental exposure indicator material 112. For example, a scanning device may be calibrated based on an optical property of the color reference area. In another example, an optical property of the environmental exposure indicator material 112 may be compared to a related optical property of the color reference area. The optical properties of the environmental exposure indicator material 112 and the color reference area may include an instantaneous value or an average value of one or more of the following properties: color, reflectance, intensity, color density, or RGB values. For example, the color state of the environmental exposure indicator materials 112 and the color of the color reference area may be compared when assessing and/or analyzing the environmental exposure indicator material 112.

Figure 7A:
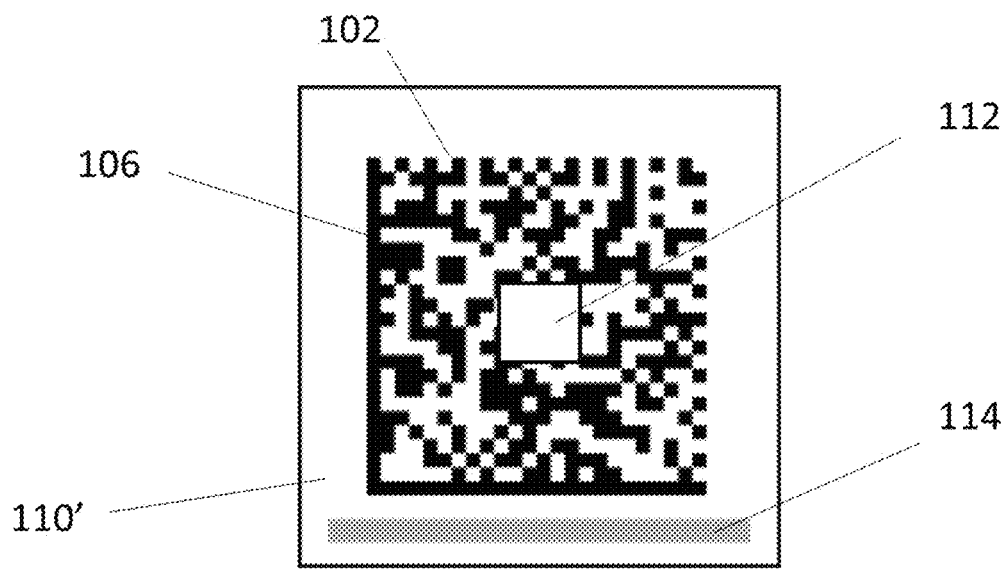
FIG. 7A illustrates a front view of the environmental exposure indicator with an example color reference area.
Figure 7B:
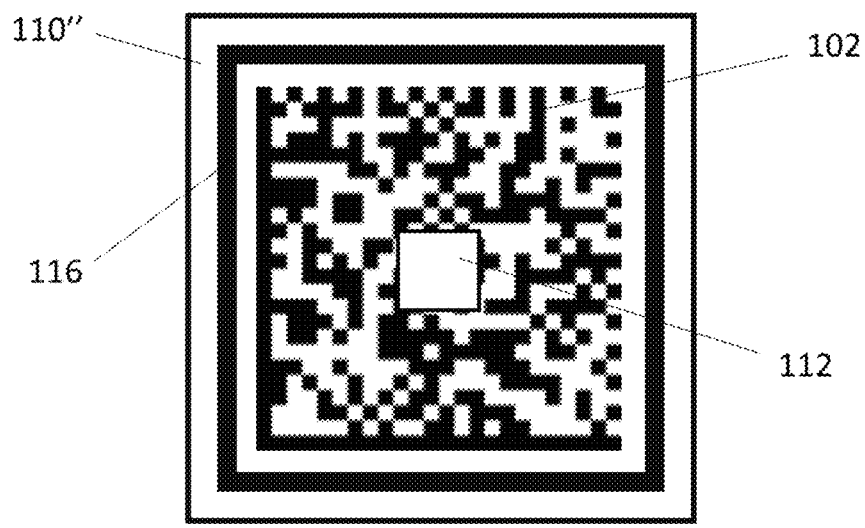
FIG. 7B illustrates a front view of the environmental exposure indicator with an example color reference area.
Figure 7C:
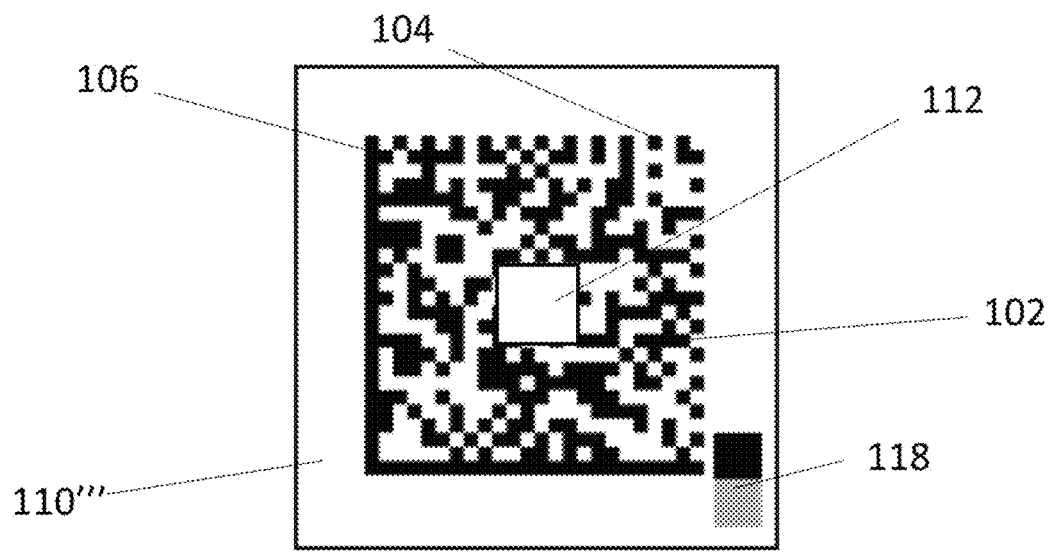
FIG. 7C illustrates a front view of the environmental exposure indicator with an example color reference area.
Figure 7D:
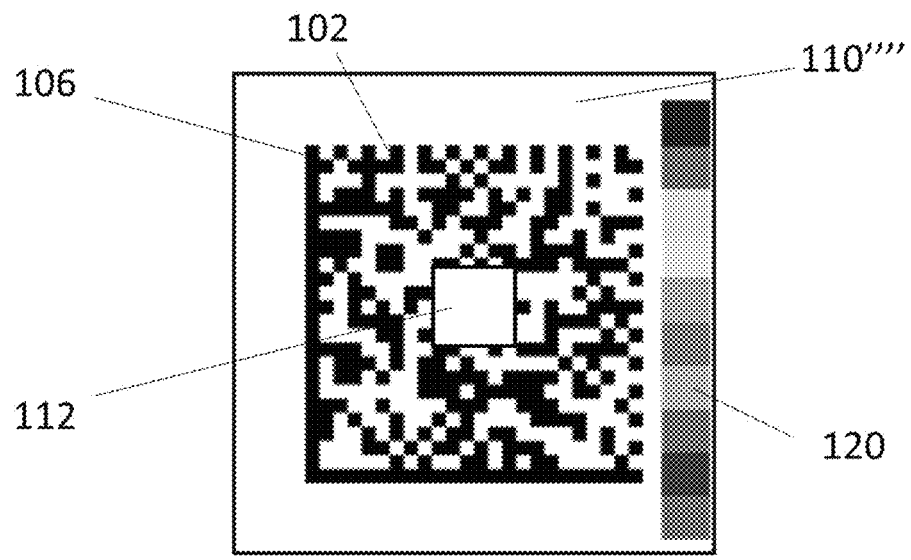
FIG. 7D illustrates a front view of the environmental exposure indicator with an example color reference area.

As illustrated by FIGS. 7A-7D, the color reference areas 114, 116, 118, 120 may be positioned in different spaces surrounding the bar code symbol 102. FIG. 7A shows a color reference area 114 displaying one color state adjacent to the bar code symbol 102. The color reference area 114 is affixed to the transparent substrate 110'. The illustrated embodiment includes a rectangular color reference area 114, but the color reference area may instead by a square, circle, or any other shape in any size. FIG. 7B illustrates a color reference area 116 that completely surrounds the bar code symbol 102. The color reference area 116 is affixed to the transparent substrate 110". FIG. 7C demonstrates a color reference area 118 that includes two color samples. The color samples correspond to two different color states of the environmental exposure indicator material 112. The color reference area 118 is affixed to the transparent substrate 110"'. Finally, FIG. 7D illustrates a color reference area 120 containing multiple colors to allow for a more precise read of the environmental exposure indicator material's 112 color state. The color reference area 120 is affixed to the transparent substrate 110'. FIGS. 7A-7D represent color reference areas shown for illustrative purposes only. It should be appreciated that the color reference areas may comprise any shape or orientation within or outside of the bar code symbol 102. In yet other embodiments, the bar code symbol 102 may be used as the color reference area 110.

Figure 8A:
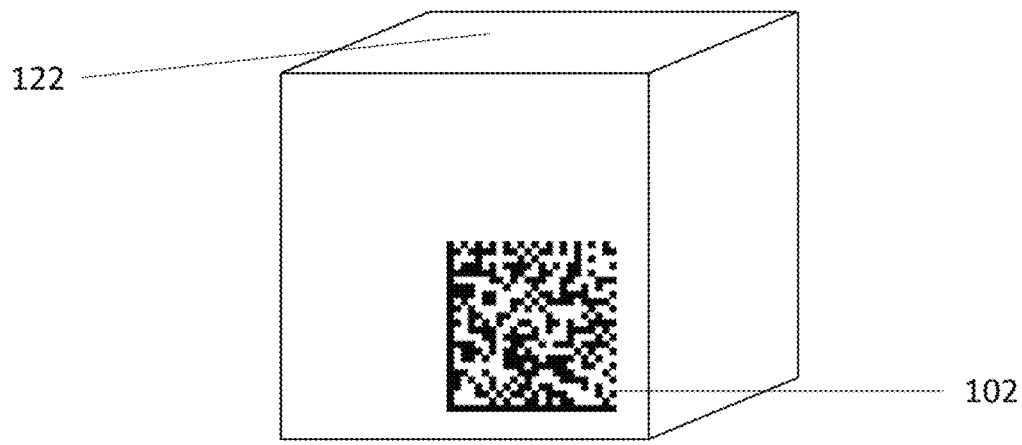
FIG. 8A illustrates the bar code symbol affixed to a package.
Figure 8B:
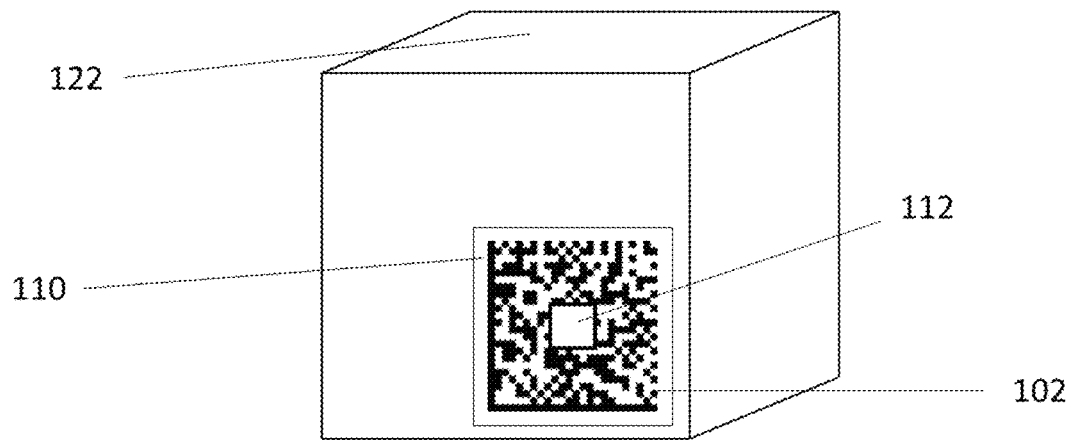
FIG. 8B illustrates the bar code symbol and overlay affixed to the package.

The overlay 108 can be affixed to an article of manufacture 122 containing a perishable host product with a pre-existed bar code symbol 102 (as shown in FIGS. 8A and 8B). The article of manufacture may be a package, box, bag, label, container, or other exterior surface. Even though several of the illustrative examples described herein refer to packages, the described techniques and features may also similarly apply to any other article of manufacture.

As the article of manufacture 122 can be produced prior and separate to the overlay 108 application, the overlay 108 can be customized to match the size of the article of manufacture 122. The perishable host product contained within the article of manufacture 122 may have a predetermined specified exposure limit for the predetermined environmental stimulus. An overlay 108 can then be placed onto the package wherein the environmental exposure indicator material 112 is configured so that the environmental exposure indicator material 112 transitions from an initial color state to at least one other color state whenever the environmental exposure indicator material 112 is exposed to the predetermined environmental stimulus beyond the predetermined specified exposure limit.

Figure 9:
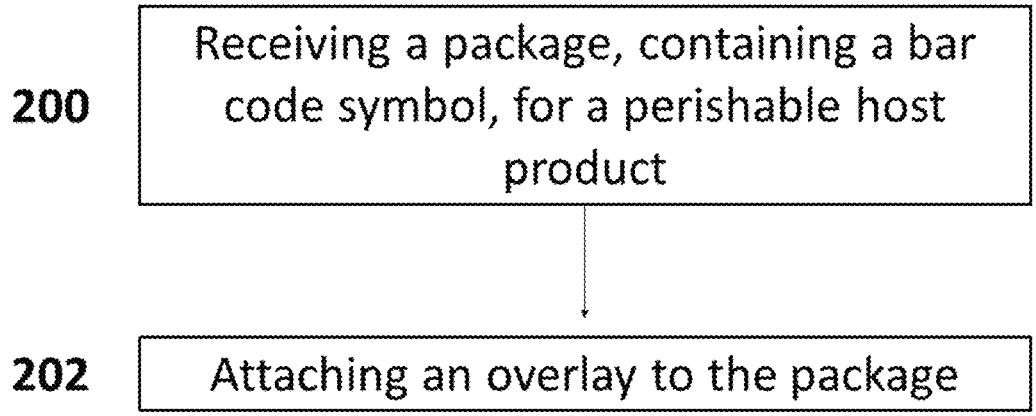
FIG. 9 illustrates a flow chart demonstrating the steps to add an environmental exposure indicator to a pre-existing bar coded package.

A flowchart for an example method for adding an environmental exposure indicator to a pre-existing article of manufacture 122 containing a bar code symbol 102 is also disclosed and shown in FIG. 9. In the first step 200, a package for a perishable host product is received. It will be appreciated that the method may be performed using packaging for perishable host products including pharmaceuticals, food products, or other products whose quality may be impacted by exposure to particular environmental stimuli. The package displays a bar code symbol 102.

In the second step 202, at a later time and a different location than where bar code was applied to the package, an overlay 108 is attached to the package. The overlay 108 contains a transparent substrate 110 and an environmental exposure indicator material 112. The environmental exposure indicator material 112 covers at least a portion of the bar code symbol 102. The environmental exposure indicator material 112 is configured to transition from an initial color state to at least one other color state in response to exposure of the package to a predetermined environmental stimulus.

There are multiple approaches that can be used to attach the overlay 108 to the package. In one embodiment, the overlay 108 may be affixed to the package by an adhesive. Particularly, if the adhesive is used across the surface of the overlay 108, a transparent adhesive may be needed. In some embodiments, the adhesive is applied directly to the package. In other embodiments, the adhesive is pre-placed as an adhesive backing on the transparent substrate 110 of the overlay 108. In this example, the adhesive may cover the entire transparent substrate 110 or only a portion of the transparent substrate 110. The adhesive may be selected from a group consisting of an aqueous emulsion adhesive, an acrylic polymer or co-polymer, an amine salt of an acrylic co-polymer, a carnauba wax, a candelilla wax, a hydrocarbon wax, Neocryl A-1052, Neocryl BT-24, Neocryl B-818, Epotuf 91-263, Ottpol 25-50E, Ottopol 25-30, Joncryl 682, and Joncryl 538A. The adhesive can be attached to the package manually by an operator, or by a machine. In some embodiments, the adhesive may be placed on a release liner to adhere to the package.

In another embodiment, the method for adding an environmental exposure indicator to a pre-existing article of manufacture 122 containing a bar code symbol 102 further includes a third step of after receiving the package, and before attaching the overlay, inserting the perishable host product in the package. Alternatively, the overlay 108 might be attached when the perishable host product is released from storage into general or less controlled use.

Additionally, the method for adding an environmental exposure indicator to a pre-existing article of manufacture 122 containing a bar code symbol 102 may include registering the bar code symbol 102 to a scanning device after the overlay 108 has been placed. In other embodiments, the bar code symbol 102 may not need to be registered and can instead be read by a scanning device trained to recognize an environmental exposure indicator atop the bar code symbol 102. In this example, static data may be encoded in the bar code symbology on the bar code symbol 102 so that the scanning device receives information that there is an environmental exposure indicator material 112 atop the bar code symbol 102.

In other embodiments, the method for adding the environmental exposure indicator to a pre-existing article of manufacture 122 may include registering the environmental exposure indicator material 112 to a scanning device. The registration may occur before the overlay 108 has been adhered to the package or the registration may occur after the overlay 108 has been adhered to the package.

In examples where both the bar code symbol 102 and the environmental exposure indicator material 112 need registering, the bar code symbol 102 and the environmental exposure indicator material 112 may be registered by the same scanning device trained to recognize both components at the same time.

In yet another embodiment, the method for adding an environmental exposure indicator to a pre-existing article of manufacture 122 containing a bar code symbol 102 further includes a third step where the package with the overlay 108 is used in a shipping process and the package is transported from one location to another. In one such example, an overlay 104 is attached to a milk carton at a manufacturing plant and the environmental exposure indicator material 112 is responsive to high temperatures that cause the milk within the carton to grow bacteria and spoil. Thus, the environmental exposure indicator material 112 can provide dynamic data to the grocery store employees as to whether the milk carton containing the milk had been exposed to such high temperatures while it was transported to a grocery store.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. An environmental exposure indicator, comprising:
   a base substrate;
   a bar code symbol on the base substrate; the bar code symbol having a bar code symbology and a plurality of cells assigned values and arranged in a matrix that encode data values according to the bar code symbology; and
   an overlay mechanically coupled to the base substrate covering at least a portion of the bar code symbol, the overlay having a transparent substrate and an environmental exposure indicator material on the transparent substrate, the environmental exposure indicator material having an initial color state and at least one other color state, the environmental exposure indicator material transitioning from the initial color state to the at least one other color state in response to exposure to a predetermined environmental stimulus,
   wherein the overlay is coupled to the base substrate in a position where the environmental exposure indicator material covers at least a portion of the bar code symbol;
   wherein the environmental exposure indicator material covers at least one cell in the matrix, so that a change in the color state of the environmental exposure indicator material from the initial color state to the at least one other color state changes the value of the at least one cell in the matrix when the bar code symbol is interpreted using the bar code symbology; and
   wherein when the environmental exposure indicator material is in either the initial color state or at least one other color state, the bar code symbol is readable.

2. The environmental exposure indicator of claim 1, wherein error correction codes in the bar code symbology mask the change of value of the at least one cell, so that data read from the bar code symbol in accordance with the bar code symbology does not change in response to change of the environmental indicator material color state from the initial color state to the at least one other color state that changes the value of the at least one cell.

3. The environmental exposure indicator of claim 1, further comprising a registration mark on at least one of the base substrate or the overlay, the registration mark identifying correct relative positioning of the base substrate and the overlay.

4. The environmental exposure indicator of claim 3, further comprising at least one registration mark on the base substrate and at least one registration mark on the overlay, the registration marks together identifying correct relative positioning of the base substrate and the overlay.

5. The environmental exposure indicator of claim 1, wherein the predetermined environmental stimulus is chosen from a list consisting of temperature excursion above a predetermined temperature threshold, temperature excursion below a predetermined temperature, cumulative exposure to temperature over a time period above a predetermined threshold, exposure to a particular chemical, exposure to a at least a predetermined amount of radiation of a particular type, and exposure to a humidity level above a predetermined threshold.

6. The environmental exposure indicator of claim 1, wherein the bar code symbology is selected from the group consisting of Aztec Code, Code 1, CrontoSign, CyberCode, DataGlyphs, Datastrip code, Data Matrix, EZcode, High Capacity Color Barcode, InterCode, MaxiCode, MMCC, NexCode, PDF417, QR Code, ShotCode, SPARQCode, and Dot Code symbologies.

7. The environmental exposure indicator of claim 1, wherein the bar code symbol encodes a Stock Keeping Unit.

8. The environmental exposure indicator of claim 1, further comprising a second environmental exposure indicator material on the overlay.

9. The environmental exposure indicator of claim 8, wherein the predetermined environmental stimulus for the environmental exposure indicator material is temperature excursion at a predetermined temperature threshold and the predetermined environmental stimulus for the second environmental exposure indicator material is cumulative exposure to a temperature over a time period.

10. The environmental exposure indicator of claim 8, wherein the environmental exposure indicator material and the second environmental exposure indicator material respond to the same type of environmental stimulus with different exposure thresholds.

11. The environmental exposure indicator of claim 1, wherein the transition between the initial color state and the at least one other color state is irreversible after exposure to the predetermined environmental stimulus.

12. The environmental exposure indicator of claim 1, wherein after exposure to the predetermined environmental stimulus ceases, the environmental exposure indicator material transitions from the at least one other color state to the initial color state.

13. The environmental exposure indicator of claim 1, wherein the environmental exposure indicator material is comprised of ultraviolet active pigments.

14. The environmental exposure indicator of claim 13, wherein the environmental exposure indicator material change from the initial color state to the at least one other color state is only detectable when the environmental exposure indicator material is exposed to ultraviolet light.

15. The environmental exposure indicator of claim 1, wherein the environmental exposure indicator material is comprised of infrared active pigments.

16. The environmental exposure indicator of claim 1, further comprising a color reference area on the overlay.

17. The environmental exposure indicator of claim 1, wherein the environmental exposure indicator material is configured so that the bar code symbol is a color reference for the change from the initial color state to the at least one other color state.

18. The environmental exposure indicator of claim 1, wherein the bar code symbology contains no information related to the environmental exposure indicator.

19. The environmental exposure indicator of claim 1, wherein the transition between the initial color state and the at least one other color state is gradual and changes over time.

20. The environmental exposure indicator of claim 1, wherein the environmental indicator material obscures at least a portion of the bar code symbol in at least one of the initial color state or the one other color state.

21. The environmental exposure indicator of claim 1, wherein the at least one other color state is colorless, white, or transparent.

22. A method for adding an environmental exposure indicator to a pre-existing bar coded package, comprising:
receiving a package for a perishable host product, the package displaying a bar code symbol having a bar code symbology and a plurality of cells assigned values and arranged in a matrix that encode data values according to the bar code symbology; and
at a later time and a different location than where bar code was applied to the package, attaching an overlay containing a transparent substrate and an environmental exposure indicator material to the package so that the environmental exposure indicator material covers at least a portion of the bar code symbol, the environmental exposure indicator material configured to transition from an initial color state to at least one color state in response to exposure of the package to a predetermined environmental stimulus, the environmental exposure indicator material covering at least one cell in the matrix, so that a change in the color state of the environmental exposure indicator material from the initial color state to the at least one other color state changes the value of the at least one cell in the matrix when the bar code symbol is interpreted using the bar code symbology.

23. The method for adding an environmental exposure indicator of claim 22, further comprising: after receiving the package, and before attaching the overlay, inserting the perishable host product in the package.

24. The method for adding an environmental exposure indicator of claim 22, wherein error correction codes in the bar code symbology mask the change of value of the at least one cell, so that data read from the bar code symbol in accordance with the bar code symbology does not change in response to change of the color state of the environmental indicator material from the initial color state to the at least one other color state that changes the value of the at least one cell.

25. The method for adding an environmental exposure indicator of claim 22, further comprising a registration mark on at least one of the transparent substrate or the overlay, the registration mark identifying correct relative positioning of the transparent substrate and the overlay.

26. The method for adding an environmental exposure indicator of claim 25, further comprising at least one registration mark on the transparent substrate and at least one registration mark on the overlay, the registration marks together identifying correct relative positioning of the transparent substrate and the overlay.

27. The method for adding an environmental exposure indicator of claim 22, wherein the predetermined environmental stimulus is chosen from a list consisting of temperature excursion above a predetermined temperature threshold, temperature excursion below a predetermined temperature, cumulative exposure to temperature over a time period above a predetermined threshold, exposure to a particular chemical, exposure to a at least a predetermined amount of radiation of a particular type, and exposure to a humidity level above a predetermined threshold.

28. The method for adding an environmental exposure indicator of claim 22, wherein the bar code symbology is selected from the group consisting of Aztec Code, Code 1, CrontoSign, CyberCode, DataGlyphs, Datastrip code, Data Matrix, EZcode, High Capacity Color Barcode, InterCode, MaxiCode, MMCC, NexCode, PDF417, QR Code, Shot-Code, SPARQCode, and Dot Code symbologies.

29. The method for adding an environmental exposure indicator of claim 22, further comprising a second environmental exposure indicator material on the overlay.

30. The method for adding an environmental exposure indicator of claim 22, further comprising a color reference area on the overlay.

31. The method for adding an environmental exposure indicator of claim 22, wherein the environmental exposure indicator material is configured so that the bar code symbol is a color reference for the change from the initial color state to the at least one other color state.

32. An environmental exposure indicator, comprising:
a base substrate;
a bar code symbol on the base substrate; the bar code symbol having a bar code symbology and a plurality of cells assigned values and arranged in a matrix that encode data values according to the bar code symbology;
an overlay mechanically coupled to the base substrate covering at least a portion of the bar code symbol, the overlay having a transparent substrate and an environmental exposure indicator material on the transparent substrate, the environmental exposure indicator material having an initial color state and at least one other color state, the environmental exposure indicator material transitioning from the initial color state to the at least one other color state in response to exposure to a predetermined environmental stimulus; and
a registration mark on at least one of the base substrate or the overlay, the registration mark identifying correct relative positioning of the base substrate and the overlay,
wherein the overlay is coupled to the base substrate in a position where the environmental exposure indicator material covers at least a portion of the bar code symbol, and
wherein when the environmental exposure indicator material is in either the initial color state or at least one other color state, the bar code symbol is readable.

33. The environmental exposure indicator of claim 32, wherein the environmental exposure indicator material covers at least one cell in the matrix, so that a change in the color state of the environmental exposure indicator material from the initial color state to the at least one other color state changes the value of the at least one cell in the matrix, and error correction codes in the bar code symbology mask the change of value of the at least one cell, so that data read from the bar code symbol in accordance with the bar code symbology does not change in response to change of the environmental indicator material color state from the initial color state to the at least one other color state that changes the value of the at least one cell.

34. The environmental exposure indicator of claim 32, wherein the predetermined environmental stimulus is chosen from a list consisting of temperature excursion above a predetermined temperature threshold, temperature excursion below a predetermined temperature, cumulative exposure to temperature over a time period above a predetermined threshold, exposure to a particular chemical, exposure to a at least a predetermined amount of radiation of a particular type, and exposure to a humidity level above a predetermined threshold, and wherein the bar code symbology is selected from the group consisting of Aztec Code, Code 1, CrontoSign, CyberCode, DataGlyphs, Datastrip code, Data Matrix, EZcode, High Capacity Color Barcode, InterCode, MaxiCode, MMCC, NexCode, PDF417, QR Code, Shot-Code, SPARQCode, and Dot Code symbologies.

35. An environmental exposure indicator, comprising:
a base substrate;
a bar code symbol on the base substrate; the bar code symbol having a bar code symbology and a plurality of cells assigned values and arranged in a matrix that encode data values according to the bar code symbology;
an overlay mechanically coupled to the base substrate covering at least a portion of the bar code symbol, the overlay having a transparent substrate and an environmental exposure indicator material on the transparent substrate, the environmental exposure indicator material having an initial color state and at least one other color state, the environmental exposure indicator material transitioning from the initial color state to the at least one other color state in response to exposure to a predetermined environmental stimulus; and
a color reference for a change from the initial color state to the at least one other color state, wherein at least one of a color reference area on the overlay is configured to be the color reference or the bar code symbol is configured to be the color reference,
wherein the overlay is coupled to the base substrate in a position where the environmental exposure indicator material covers at least a portion of the bar code symbol; and
wherein when the environmental exposure indicator material is in either the initial color state or at least one other color state, the bar code symbol is readable.

36. The environmental exposure indicator of claim 35, wherein the color reference is the color reference area on the overlay.

37. The environmental exposure indicator of claim 35, wherein the bar code symbol is the color reference.

38. The environmental exposure indicator of claim 35, further comprising a registration mark on at least one of the base substrate or the overlay, the registration mark identifying correct relative positioning of the base substrate and the overlay.

39. The environmental exposure indicator of claim 35, wherein the predetermined environmental stimulus is chosen from a list consisting of temperature excursion above a predetermined temperature threshold, temperature excursion below a predetermined temperature, cumulative exposure to temperature over a time period above a predetermined threshold, exposure to a particular chemical, exposure to a at least a predetermined amount of radiation of a particular type, and exposure to a humidity level above a predetermined threshold, and wherein the bar code symbology is selected from the group consisting of Aztec Code, Code 1, CrontoSign, CyberCode, DataGlyphs, Datastrip code, Data Matrix, EZcode, High Capacity Color Barcode, InterCode, MaxiCode, MMCC, NexCode, PDF417, QR Code, Shot-Code, SPARQCode, and Dot Code symbologies.

40. The environmental exposure indicator of claim 35, further comprising a second environmental exposure indicator material on the overlay.

* * * * *